United States Patent [19]

Gleave

[11] 4,102,945

[45] Jul. 25, 1978

[54] FILLED CYANOACRYLATE ADHESIVE COMPOSITIONS

[75] Inventor: Edward Roger Gleave, Dublin, Ireland

[73] Assignee: Loctite (Ireland) Limited, Dublin, Ireland

[21] Appl. No.: 814,582

[22] Filed: Jul. 11, 1977

[30] Foreign Application Priority Data

Jul. 14, 1976 [IE] Ireland ................................ 1554/76

[51] Int. Cl.² ............................................. C08L 9/00
[52] U.S. Cl. ................................... 260/879; 156/331; 156/334; 260/881; 526/298
[58] Field of Search ................. 526/298; 260/879, 881

[56] References Cited

U.S. PATENT DOCUMENTS

| 2,794,788 | 6/1957 | Coover et al. | 260/17 |
| 3,607,542 | 9/1971 | Leonard | 156/285 |
| 3,663,501 | 5/1972 | Adams et al. | 260/41 R |
| 3,692,752 | 9/1972 | Setsuda et al. | 260/78.5 N |
| 3,836,377 | 9/1974 | Delahunty | 106/287 |
| 4,042,442 | 8/1977 | Dombroski et al. | 156/310 |

*Primary Examiner*—Richard B. Turer
*Attorney, Agent, or Firm*—Jean B. Mauro

[57] ABSTRACT

A cyanoacrylate adhesive composition thickened by a copolymer or terpolymer resin capable of being dissolved or solvated by the cyanoacrylate monomer exhibits significantly improved peel strength. Storage stability is also enhanced. Preferred thickeners are acrylonitrile-butadiene-styrene terpolymers, methacrylate-butadiene-styrene terpolymers, and vinylidene chloride-acrylonitrile copolymers. Preferred monomers are methyl and ethyl cyanoacrylates.

4 Claims, No Drawings

FILLED CYANOACRYLATE ADHESIVE COMPOSITIONS

BACKGROUND OF THE INVENTION

1. Field of the Invention

This invention relates to cyanoacrylate adhesive compositions which are improved in peel strength by incorporation of certain organic fillers.

2. Description of the Prior Art

Liquid cyanoacrylate compositions have long been known in the art as excellent adhesives. One of their primary shortcomings, however, has been their relatively low peel strength.

A variety of fillers has been incorporated into cyanoacrylate adhesive compositions to bring about certain changes in properties. U.S. Pat. No 2,794,788 teaches thickening of cyanoacrylate adhesives by dissolving therein quantities of polymeric alkyl cyanoacrylates, as well as other compounds including polyacrylates, methacrylates and cellulose esters such as acetate, propionate and butyrate.

U.S. Pat. No. 3,836,377 notes among the additional known thickeners polyvinyl ethers such as polyvinylmethyl ether. U.S. Pat. No. 3,692,752 discloses thickened cyanoacrylate solutions containing certain polyether acrylates/methacrylates, acrylic/methacrylic esters of bis(hydroxyalkyl) phosphonic acid derivatives, and acrylic/methacrylic esters of tris(hydroxyalkyl) cyanuric acid derivatives.

The preceding references relate to thickened homogeneous solutions containing organic compounds as thickeners. Various inorganic materials have also been proposed as fillers, which also have the effect of thickening the composition. Thus, U.S. Pat. No. 3,663,501 teaches preparation of a dental cement containing inert, finely-divided solids such as fused silica, quartz and alumina. Similarly, U.S. Pat. No. 3,607,542 teaches the preparation of a water-resistant cyanoacrylate paste containing insoluble, inert fillers such as salts of calcium, titanium, zinc, tin, aluminum, iron and copper, among others.

None of the above references relates to specific improvement of peel strength, nor to the use of the specific organic additives of this invention. Two of the additives of this invention are known, however, as impact-strength improving for certain rigid plastics such as rigid PVC. These additives are acrylonitrile-butadiene-styrene (ABS) and methacrylate-butadiene-styrene (MBS) block or graft terpolymers. These materials are not known as peel strength modifiers, nor are they known for any use in room-temperature-curable adhesive systems.

SUMMARY OF THE INVENTION

According to the invention, there is provided a thickened, curable adhesive composition comprising:
(a) a monomeric ester of 2-cyanoacrylic acid,
(b) for each 100 parts by weight of monomeric ester, about 3 to about 30 parts by weight of an organic material selected from the group consisting of
  (i) acrylonitrile-butadiene-styrene terpolymer
  (ii) methacrylate-butadiene-styrene terpolymer
  (iii) vinylidene chloride-acrylonitrile copolymer containing at least 50 molar percent vinylidene chloride said composition having improved peel strength over the corresponding unthickened adhesive.

The composition also preferably contains one or more known acidic and free radical inhibitors, and optionally other functional additives for such purposes as improving thermal resistance, providing color, accelerating the cure reaction, providing cross-linking, etc.

The compositions of this invention exhibit substantially increased peel strength in comparison with control cyanoacrylate adhesives. It has also been unexpectedly found that the compositions exhibit improved storage stability as well and do not have the undesirable "stringing" behavior of other thickened cyanoacrylate compositions.

DETAILED DESCRIPTION OF THE INVENTION

The benefits of this invention are achievable with essentially all adhesive compositions based upon cyanoacrylate esters. Most commonly, the esters have the formula

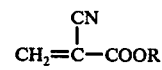

wherein R represents a $C_{1-16}$ alkyl, cycloalkyl, alkenyl, cycloalkenyl, phenyl or heterocyclic (such as furfuryl) radical. Naturally, the above R group can contain any linkages or substituents which do not adversely affect the monomer in the performance of its intended function in the cyanoacrylate adhesive compositions, such as strongly basic substituents which may adversely affect the stability of the adhesive compositions. For purposes of this invention, the preferred monomers are those wherein R is a cyclohexyl or a $C_1$ to $C_6$ alkyl, or alkenyl radical. Most preferred are methyl and ethyl cyanoacrylates. The esters may be used singly or in admixture.

The above monomeric esters of 2-cyanoacrylic acid can be prepared by methods known in the art, such as those described in U.S. Pat. Nos. 2,467,927 to Ardis, issued Apr. 9, 1949 and 3,254,111 to Hawkins et al, issued May 31, 1966.

Cyanoacrylate ester adhesive compositions generally contain an anionic inhibitor, e.g., an acidic substance, soluble in the ester of 2-cyanoacrylic acid, which inhibits anionic polymerization. The specific inhibitor chosen is not critical to this invention, and a number of suitable inhibitors of anionic polymerization are well known in the art.

The best known are the soluble acidic gases such as sulfur dioxide, sulfur trioxide, nitric oxide, and hydrogen fluoride. More recently, organic sultone inhibitors have been developed, the sultone being generally represented by the formula

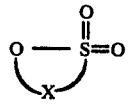

wherein X is an organic radical joining the $—S(O_2)O—$ group in a 4, 5, or 6 member heterocyclic ring, preferably a 5 member heterocyclic ring. Preferably, X is a hydrocarbon group, although it can contain any substituents or linkages which do not adversely affect the sultone for its intended use as a stabilizer of the adhesive composition. Another excellent class of stabilizers are the organic sulfonic acids, preferably having a molecular weight less than about 400. To be optimally useful as a stabilizer in the adhesive compositions, the sulfonic acid should have a pKA value (dissociation constant in water) of less than about 2.8, and preferably less than about 1.5.

While not essential, the cyanoacrylate adhesive compositions of this invention generally also contain an inhibitor of free radical polymerization. The most desirable of these inhibitors are of the phenolic type, such as quinone, hydroquinone, t-butyl catechol, p-methoxyphenol, etc.

The above inhibitors may be used within wide ranges, but the following general guidelines are representative of common practice, all figures being weight percent of the adhesive composition: acidic gases—from about 0.001% to about 0.06% by weight; sultones—from about 0.1% to about 10% by weight; sulfonic acids—from about 0.0005% to about 0.1% by weight; free radical inhibitors—from about 0.001% to about 1%.

Other common additives for cyanoacrylate adhesive compositions are plasticizers. Plasticizers serve to make the cured bonds less brittle and, therefore, more durable. The most common of these plasticizers are $C_1$ to $C_{10}$ alkyl esters of dibasic acids such as sebasic acid and malonic acid. Other plasticizers, such as diaryl ethers and polyurethanes, also may be used, and a variety of other plasticizers are also known.

In addition to the monomer, the second required ingredient is a thickener of at least one of the types previously described. Suitable thickeners are organic copolymers or terpolymers of the block or graft polymerization types. In order to perform suitably, the polymers must be "compatible" with the cyanoacrylate monomer. By the term "compatible" is meant that the polymers do not significantly interfere with the storage stability of the adhesive composition. Moreover, as will be discussed further below, it appears that the polymers should be at least partially solvated by the cyanoacrylate monomer so that a homogeneous solution or suspension is formed. Molecular weight is not believed to be a critical parameter in selecting suitable polymeric thickeners of the types specified; accordingly, selection of molecular weight is deemed to be a matter of choice. Obviously, such factors as solubility and thickening ability are affected, but selection of molecular weight in these respects is well within the skill of the art based upon routine experimentation.

Each of the thickeners of this invention is unique in that it imparts a higher peel strength to standard adhesive bonds formed using a cyanoacrylate adhesive composition containing it, than the peel strength of similar bonds formed using the same composition without any thickener, or using the same composition thickened by means other than members of the said group of alternative thickeners.

The peel strength is a practically useful property of an adhesive bond, being one parameter of what is loosely referred to as the bond strength. It is determined in accordance with ASTM D 1876 of American Standard Test Methods, to which the reader is referred for a full description. Briefly, however, two pieces of steel shim, each measuring 10 × 1 × 0.005 inches, are first degreased by treatment with solvent vapor, then bonded together face-to-face using the adhesive composition under investigation, and leaving two free ends. The free ends are grasped in a special dynamometer and the peel strength is stated as or in terms of the force required to pull the pieces of shim apart at a fixed or given speed. The peel strength is expressed in kg force per centimeter of strip width.

While any polymers meeting the above functional descriptions should be suitable, preferred polymers are ABS and MBS terpolymers and vinylidene chloride-acrylonitrile copolymers.

A further unique feature of the invention resides in an effect which the thickeners used have on the composition viscosity. High polymers of the prior art which are completely soluble in cyanoacrylates increase the viscosity substantially. However, with viscous cyanoacrylate adhesives a problem known as "stringing" arises. When the adhesive is being used, a fine, hairlike thread of adhesive may be drawn from the liquid, and this interferes with the convenient use of the adhesive. The thickeners used in the invention also increase the adhesive's viscosity, but in a slightly different way. Because their molecules are discontinuous (block and graft copolymers rather than continuous homopolymers or frequently alternating copolymers) they can never be completely dissolved. It is believed that, when dispersed in cyanoacrylate, the styrene-acrylonitrile sections of ABS molecules, and the methacrylate sections of MBS molecules, for example, are solvated by the cyanoacrylate monomer, but that the rubbery, butadiene or styrene-butadiene section of the molecules, are not solvated. In this way a smooth suspension is formed, which could be called a "discontinuous solution." This discontinuity is believed to discourage the formation and propagation of "strings" and is a useful property of the thickeners in question.

Another advantageous and unexpected feature of the invented compositions is their greater stability in storage, as determined by conventional accelerated shelf life tests, in comparison with control compositions, including comparison with the unmixed monomer from which a given composition of the invention is prepared. This feature is illustrated in Examples 13 to 18 below. Cyanoacrylate adhesives made with ABS, MBS and polyvinylidene chloride-co-acrylonitrile polymers had greater stability in accelerated tests than the monomers from which the adhesives were made. This is believed to be because all these materials as manufactured commonly contain small quantities of acids, and acids are used as stabilizers for cyanoacrylates.

EXAMPLES

The invention will be understood in greater detail from the following description of a number of particular embodiments thereof, given by way of example only. Parts quoted are by weight. Effective and preferred ranges have been included, but they are approximations only. Test adhesives were made by adding known amounts of preferred thickeners to suitably stabilized cyanoacrylate monomers, stirring the mixture and heating it sufficiently to obtain a uniform dispersion or solution of the thickener in the monomer. The peel strength of these adhesives was measured and compared to that of cyanoacrylate monomers thickened with poly(methylmethacrylate), a well-known thickener of the prior art, designated below as PMM.

In these examples the abbreviated designations for the thickeners are to be understood as follows:

ABS No. 1: An ABS polymer of low molecular weight, low to medium elastomer content, and high styrene content; sold by Borg-Warner under the trade name "Blendex 211."

ABS No. 2: An ABS polymer of medium molecular weight, medium elastomer content, and medium styrene content; sold by Borg-Warner under the trade name "Blendex 101."

MBS Nos. 1 and 2: These are MBS polymers made of polymerizating a mixture of styrene and methacrylate monomers in the presence of a latex of polybutadiene. The ratios of the components are chosen so as to maximize certain properties of mixtures of these polymers with polyvinyl chloride, the properties being as follows:

MBS No. 1: Impact strength (only); sold by Borg-Warner under the trade name "Blendex 436."

MBS No. 2: Impact strength and clarity; sold by Rohm & Haas under the trade name "Paraloid KM 611."

VAC: A vinylidene chloride/acrylonitrile copolymer, wherein vinylidene chloride is the major component; sold by Dow under the trade name "Saran F 220."

| Example No. | Monomer | Quantity used (parts) | Thickener | Quantity used (parts) | Approximate Effective Range (parts) | Approximate Preferred Range (parts) | Peel Strength kg cm$^{-1}$ |
|---|---|---|---|---|---|---|---|
| 1. | Methyl cyanoacrylate | 100 | None | — | — | — | 0.11 |
| 2. | Methyl cyanoacrylate | 100 | PMM | 8 | — | — | 0.34 |
| 3. | Methyl cyanoacrylate | 100 | ABS No. 1 | 10 | 5–50 | 10–30 | 0.58–0.88 |
| 4. | Methyl cyanoacrylate | 100 | ABS No. 1 | 25 | 5–50 | 10–30 | 2.00 |
| 5. | Methyl cyanoacrylate | 100 | ABS No. 2 | 20 | 5–50 | 10–30 | 1.39 |
| 6. | Methyl cyanoacrylate | 100 | MBS No. 1 | 20 | 5–50 | 10–30 | 0.43 |
| 7. | Methyl cyanoacrylate | 100 | MBS No. 2 | 20 | 5–50 | 10–30 | 1.43 |
| 8. | Methyl cyanoacrylate | 100 | VAC | 10 | 2–20 | 4–15 | 1.32 |
| 9. | Ethyl cyanoacrylate | 100 | None | — | — | — | 0.15 |
| 10. | Ethyl cyanoacrylate | 100 | PMM | 8 | — | — | 0.23 |
| 11. | Ethyl cyanoacrylate | 100 | ABS No. 1 | 20 | 5–50 | 10–20 | 0.87 |
| 12. | Ethyl cyanoacrylate | 100 | ABS No. 2 | 20 | 5–50 | 10–30 | 1.36 |

Examples 1, 2, 9 and 10 relate to controls and are given for comparison purposes only. Each peel strength value given is the mean of from 10 to 20 determinations carried out on each of two pairs of bonded steel strips, i.e., it is the mean of from 20 to 40 determinations.

Turning to the above-mentioned feature of stability in storage, it may be observed that cyanoacrylates undergo very gradual polymerization in storage at room temperature even in the presence of stabilizers. This polymerization may cause adhesives based on them to solidify or gel in about 1 or 2 years at room temperature. The process is accelerated at higher temperatures, and it is estimated that the process is about 20 times as fast at 55° C as it is at 20° C. Shelf-life stability is thus conveniently measured at 55° C. The following examples 13 and 15 illustrate this matter by way of control tests carried out on conventionally stabilized cyanoacrylates, whereas examples 14 and 16–18 illustrate the invention on its storage stability aspect.

| Example No. | Ingredient | Quantity (parts) | Shelf-life at 55° C |
|---|---|---|---|
| 13. | Methyl cyanoacrylate (control) | 100 | 31 days |
| 14. | Methyl cyanoacrylate plus ABS No. 1 | 100 20 | 34 days |
| 15. | Ethyl cyanoacrylate (control) | 100 | 20.5 days |
| 16. | Ethyl cyanoacrylate plus ABS No. 2 | 100 20 | 40 days |
| 17. | Methyl cyanoacrylate plus MBS No. 2 | 100 20 | 54 days |
| 18. | Methyl cyanoacrylate plus VAC | 100 10 | 39 days |

What is claimed is:

1. A thickened, curable adhesive composition comprising:
   (a) a monomeric ester of 2-cyanoacrylic acid,
   (b) for each 100 parts by weight of monomeric ester, about 3 to about 30 parts by weight of an organic material which is an acrylo-nitrile-butadiene-styrene terpolymer
   said composition having improved peel strength over the corresponding unthickened adhesive.

2. A composition of claim 1 containing in addition a stabilizing amount of an acidic stabilizer and a free radical inhibitor.

3. A composition of claim 1 wherein the monomeric ester is methyl cyanoacrylate or ethyl cyanoacrylate.

4. A composition of claim 1 wherein the concentration of the organic material is about 5 to about 25 parts by weight.

* * * * *